United States Patent [19]
Damian

[11] Patent Number: 5,395,289
[45] Date of Patent: Mar. 7, 1995

[54] CONSTANT VELOCITY CONTROL OF THE TRIPOD TYPE

[75] Inventor: Karl Damian, Rodgau, Germany

[73] Assignee: Löhr & Bromkamp GmbH, Offenbach am Main, Germany

[21] Appl. No.: 995,761

[22] Filed: Dec. 18, 1992

[30] Foreign Application Priority Data

Dec. 20, 1991 [DE] Germany ............... 41 42 214.7

[51] Int. Cl.⁶ ............................................. F16D 3/205
[52] U.S. Cl. ..................................... 464/111; 464/905
[58] Field of Search ............... 464/111, 120, 122, 123, 464/124, 132, 905

[56] References Cited

U.S. PATENT DOCUMENTS

| | | | |
|---|---|---|---|
| 3,677,032 | 7/1972 | Suzuki | 464/132 X |
| 4,129,343 | 12/1978 | Janssen | 64/17 A X |
| 4,507,100 | 3/1985 | Doréet al. | 464/124 X |
| 4,674,993 | 6/1987 | Mazziotti et al. | 464/111 |
| 4,684,356 | 8/1987 | Kimata et al. | 464/111 |
| 4,891,035 | 1/1990 | Sasaki et al. | 464/111 |
| 4,971,595 | 11/1990 | Sasaki et al. | 464/111 |

FOREIGN PATENT DOCUMENTS

| | | | |
|---|---|---|---|
| 0426186 | 11/1990 | European Pat. Off. | |
| 2224669 | 10/1974 | France | 464/111 |
| 2343540 | 3/1974 | Germany | |
| 2831044 | 11/1979 | Germany | |
| 4110311 | 10/1991 | Germany | |

OTHER PUBLICATIONS

English Translation of Abstract of Japanese Patent #6343027 dated Aug. 8, 1986.

*Primary Examiner*—Daniel P. Stodola
*Assistant Examiner*—Eileen A. Dunn
*Attorney, Agent, or Firm*—Harness, Dickey & Pierce

[57] ABSTRACT

A tripod joint has an outer joint part with three circumferentially distributed axis-parallel recesses which form circumferentially opposed tracks. An inner joint part with a star-shaped cross-section and three circumferentially distributed arms engages the recesses of the outer joint part. The arms hold roller assemblies. Each roller assembly includes a roller carrying means and a roller directly riding on the tracks. On each arm, a roller carrying element is held to be axially and angularly movable relative to the arm axis. Also, on each roller carrying element, the roller is axially secured and rotatably supported via a rolling contact bearing. A friction reducing mechanism is provided between the roller carrying elements and rollers. The friction reducing mechanism is effective with respect to the relative rotational movements taking place between the elements and rollers under axial forces.

15 Claims, 4 Drawing Sheets

CONSTANT VELOCITY CONTROL OF THE TRIPOD TYPE

BACKGROUND OF THE INVENTION

The present invention relates to a tripod joint, and more specifically, to a tripod joint with an outer joint part having three circumferentially distributed axis-parallel recesses which form circumferentially opposed tracks. An inner joint part has a star-shaped cross-section and three circumferentially distributed arms which engage the recesses of the outer joint part. The arms hold roller assemblies which each include a roller carrying means and a roller directly riding on the tracks. On each arm, a roller carrying element is held so as to be axially and angularly movable relative to the arm axis. Also, on each roller carrying element, a roller is axially secured and rotatably supported via a rolling contact bearing.

Known tripod joints are described in DE 28 31 044 (Honda), and DE 39 36 601 (GKN) for example. In both cases, the roller, especially via a needle bearing, is rotatably supported on a roller carrier. The roller carriers are arranged to be axially movable on the arm and pivotable relative to the arm axis.

In the first design, movability is achieved via an inner ring which, via a spherical outer face, engages an at least partially internally spherical inner face of the roller carrier. The inner ring is designed to be internally cylindrical and with a cylindrical arm being axially movable therein.

In the second case, the roller carrier is provided with an internally cylindrical inner aperture, which is axially movably and pivotably engaged by an arm with a part-spherical outer end.

Below, all parts of the "roller assembly" with the exception of the "roller" itself will be referred to as "roller carrying means". The expression "elements of the roller assembly" refers to the "roller carrier" and the "roller" itself, with the "roller carriers" being regarded as "non-rotating elements of the roller assembly".

With a joint rotating in the articulated condition, there occurs, with reference to the inner joint part, radially oscillating movement of the rollers relative to the joint axis and pivoting movement of the rollers on the arms. At the same time, with reference to the outer joint part, there occurs longitudinally extending oscillating rolling movement of the rollers along the tracks. The first mentioned radial and pivoting movements are accompanied by sliding friction. The next mentioned rolling movement predominantly occurs in the form of rolling contact movement. As a result of the friction forces, the prior art tripod joints, with an increasing joint articulation angle, are characterised by an increase in the joint excitation forces, e.g. in the cyclic forces generated in the joint and transmitted to the driveline. If, as a result of the movements occurring when the joint rotates in an articulated condition, an arm, with reference to the outer joint part, is displaced radially inwardly, with the roller having to support itself radially inwardly relative to the outer joint part, the sliding friction forces are particularly high and disadvantageous. In particular, this applies to sliding friction forces caused by supporting forces resulting from tilting moments around axes at the roller assemblies assumed to be located transversely relative to the joint axis.

SUMMARY OF THE INVENTION

It is an object of the invention to provide a tripod joint which reduces the excitation forces which result from sliding friction in the joint. A first solution provides a rolling contact bearing between at least one end face of a roller and an opposed face of a holding means connected to the roller carrying element. A second solution provides each rolling member of the rolling contact bearing to be held by a cage. In both cases, between the roller carrying elements and rollers, friction reducing means is provided. The friction reducing means is effective irrespective of relative rotational movements taking place between the elements and rollers. This is particularly advantageous if relative axial forces occur between the two components.

The friction reducing means, with reference to the rollers, is arranged at the roller carriers relative to the opposing holding means. Thus when the joint rotates in the articulated condition, the tumbling and diving movements of the arms relative to the rollers result in constantly changing axial forces between the roller carriers and rollers. The axial forces, upon relative rotational movements between the roller carriers and rollers, lead to increased friction forces. The friction forces are reduced as a result of the above. The reduction in friction forces smoothes and facilitates the movement of the rollers in the tracks in the axial direction, with reference to the outer joint part, so that the resulting joint excitation forces are reduced.

As the axial supporting forces between the roller carrier and roller, with reference to their axis, constantly change their relative orientation when the joint rotates in the articulated condition. It is proposed that the friction reducing means in accordance with the invention, relative to the respective holding means, be provided opposite the two end faces of the rollers at the roller carriers. Further, the holding means at the roller carrier may either be an integral annular shoulder or a combination of a disc and securing ring held in an external groove.

A rolling contact bearing may be provided between at least one end face of a roller and an opposed face of the holding means connected to the roller carrier. Thus, more sophisticated design measures achieve a maximum reduction in friction. The rolling contact bearing should preferably be provided at both axial end faces of the roller, e.g. on the radial inside and outside of the roller with reference to the joint axis. The rolling contact bearings are preferably provided with a cage. The rolling members of the rolling contact bearings may be designed as balls or needles. In the case of needles, outwardly increasing conical needles are preferred.

Further, additional elements whose surfaces reduce sliding friction may be provided in each case between an end face of a roller and holding means connected to the roller carrier. Also, a holding element, which is connected to the roller carrier and whose surface reduces sliding friction, is positioned opposite at least one end face of the roller.

It is advantageous to combine the two above-mentioned embodiments such that the former is provided to cooperate with a radially inner shoulder element at the roller carrier. The latter is arranged at the opposed end face of the roller on the radial outside of the roller carrier.

The surfaces which reduce sliding friction may be provided in the form of phosphated surfaces, plastic-coated surfaces at the metallic elements or the surfaces of the components are made of a tribologically advantageous material. A steel-on-steel contact between the rollers and parts of the roller carrying means is thus advantageously avoided.

In a preferred further development of the invention, the additional elements or holding means includes shoulder elements. With reference to the roller carrier, the shoulder elements are provided with an at least axially outwardly directed surface which reduces sliding friction and which embraces the end face of the roller carrying element. Such a design not only leads to a reduction in friction between the roller and roller carrier, but also between the roller carrier and the outer joint part in case the roller carriers, with reference to their axis, are directly axially supported relative to the outer joint part. Such a design is not required if the rollers themselves, with reference to their own axis, provide axial support by engaging the tracks.

As far as the contents at the shoulder elements are concerned, the expression "friction reducing surfaces" applies the same as previously mentioned with reference to the additional elements and holding elements themselves to which the shoulder elements may preferably be integrally connected.

In a preferred embodiment, the additional elements or holding elements are radially resilient annular elements. The elements are distributed around the circumference of, or through internal tension, secured to the roller carrier. However, the shoulder elements may also be provided separately from the additional elements or holding elements at the roller carrier and may be independently inserted or clamped on.

From the following detailed description taken in conjunction with the accompanying drawings and subjoined claims, other objects and advantages of the present invention will become apparent to those skilled in the art.

BRIEF DESCRIPTION OF THE DRAWINGS

Preferred embodiments of the invention are illustrated in the drawing wherein.

DETAILED DESCRIPTION OF THE PREFERRED EMBODIMENT

Below, FIGS. 1 through 3 will be described together to the extent that they include identical elements, which have been given the same reference numbers.

Figure 1:
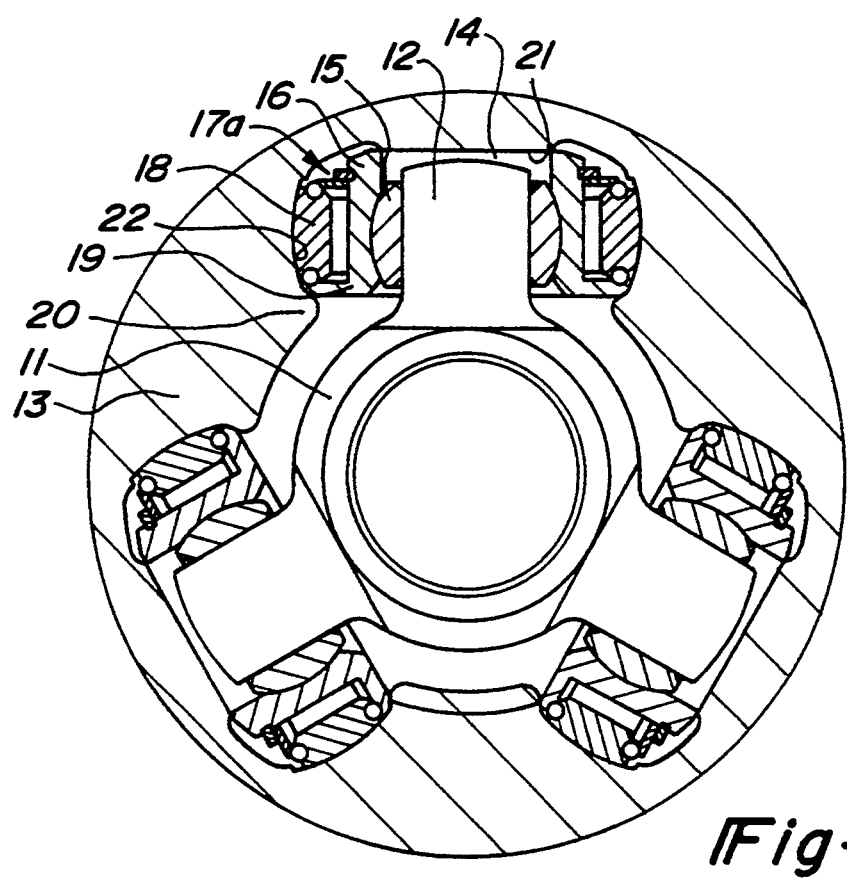
FIG. 1 is a cross sectional view of a joint with a first tripod design in accordance with the invention.
Figure 2:
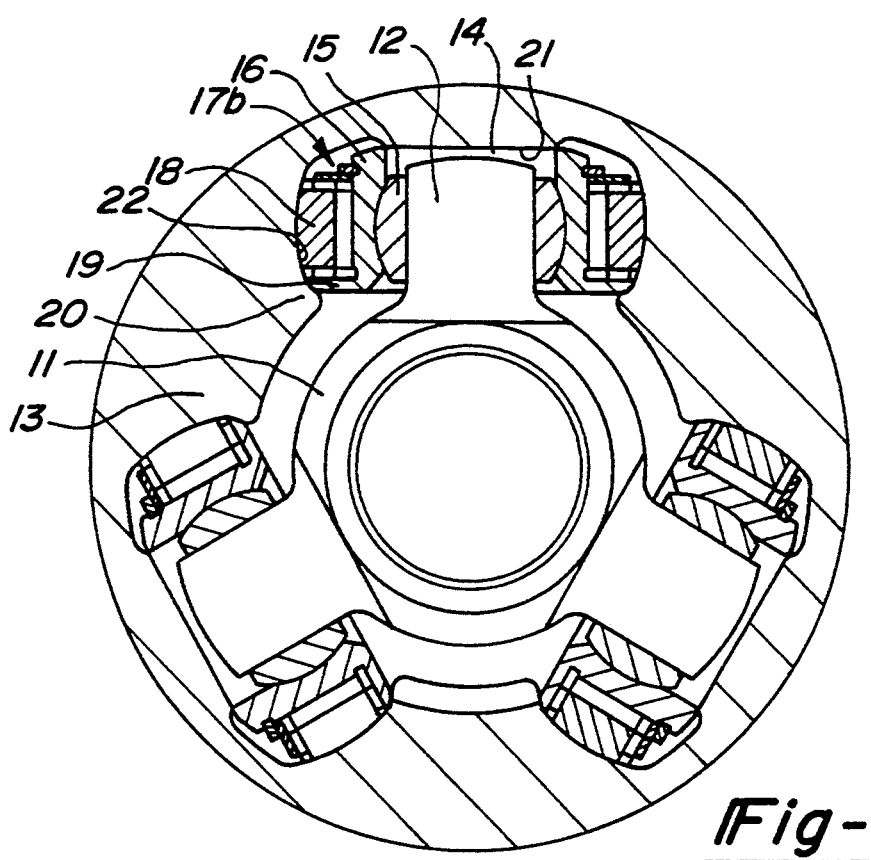
FIG. 2 is a cross sectional view of a joint with a first tripod design in accordance with the invention.
Figure 3:
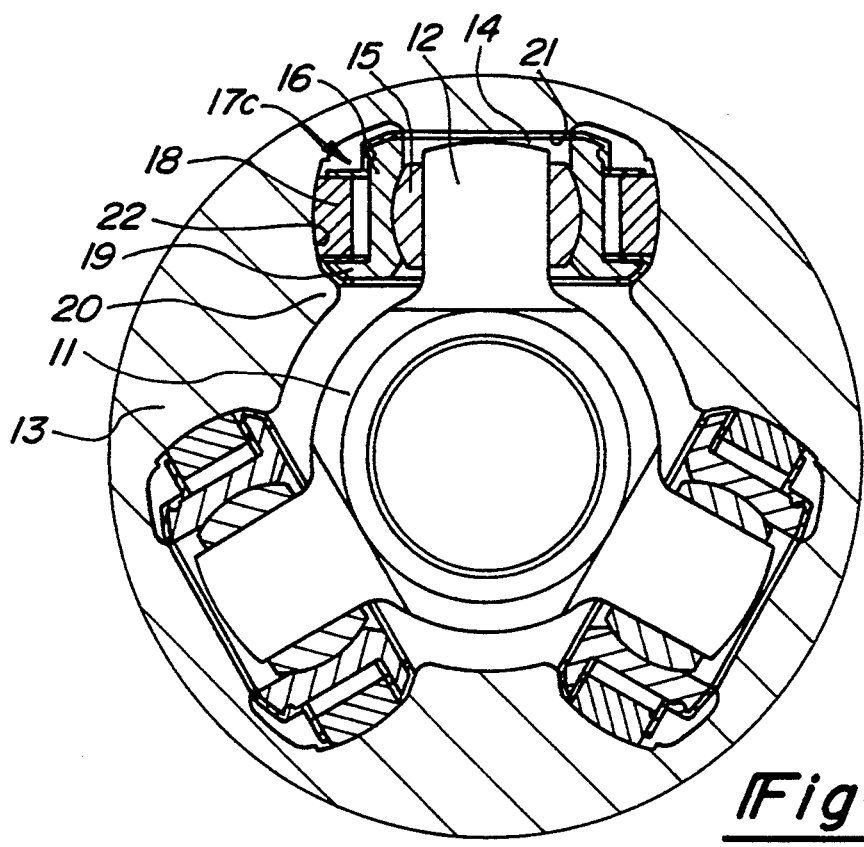
FIG. 3 is a cross sectional view of a joint with a first tripod design in accordance with the invention.

FIGS. 1 through 3 each show a substantially annular inner joint part 11 with circumferentially distributed radial cylindrical arms 12. An outer joint part 13 with circumferentially distributed recesses 14 engages the arms 12. Roller assemblies are provided on the arms 12.

Each roller assembly includes an inner ring 15 with an internally cylindrical inner surface and an externally spherical outer surface. Relative to the arm 12, the inner ring 15 may oscillate axially relative to the arm axis. On the inner ring 15 a roller carrier 16 is held which, via an internally spherical recess, is pivotably positioned on the externally spherical outer surface of the inner ring 15. A roller 18 is rotatably held on the roller carrier 16 via bearing means 17a through c. The externally spherical roller 18 rides on one of the tracks 22 in the recess 14. In the radial interior of the roller assembly, the two halves of the track each include a shoulder 20 of which, on the radial inside, supports the roller carrier 16 via an annular shoulder 19. The roller carrier 16 may be supported on a supporting face 21 on the radial outside of the roller assembly. The bearing means 17a (FIG. 1) are described in greater detail in FIG. 7, the bearing means 17b (FIG. 2) in FIG. 8 and the bearing means 17c (FIG. 3) in FIG. 9.

Figure 4:
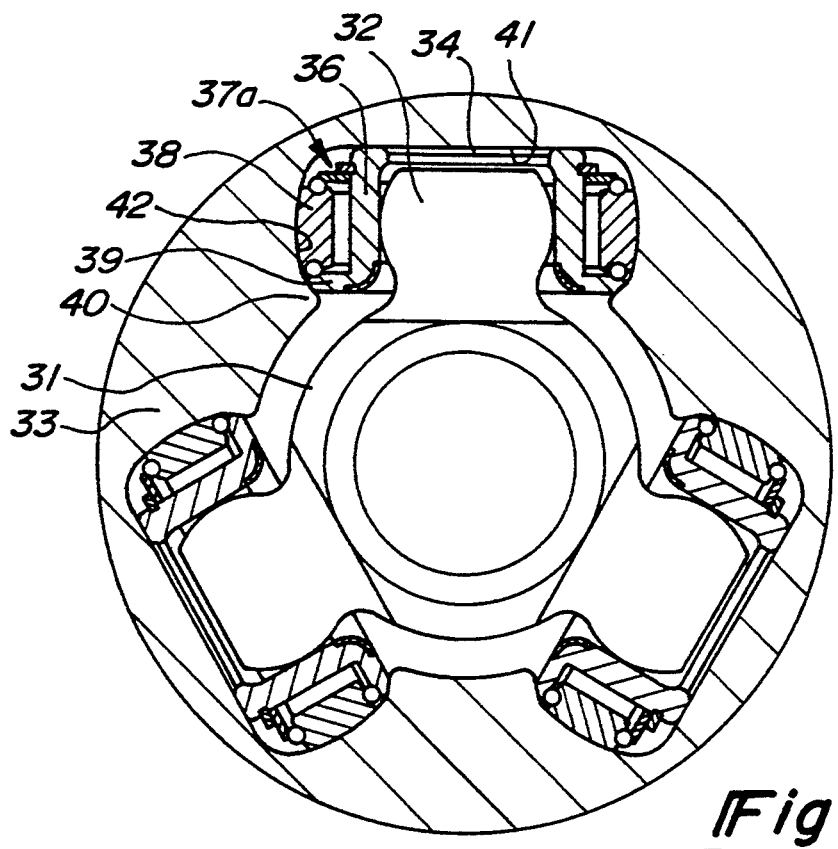
FIG. 4 is a cross sectional view of a joint with a second tripod design in accordance with the present invention.
Figure 5:
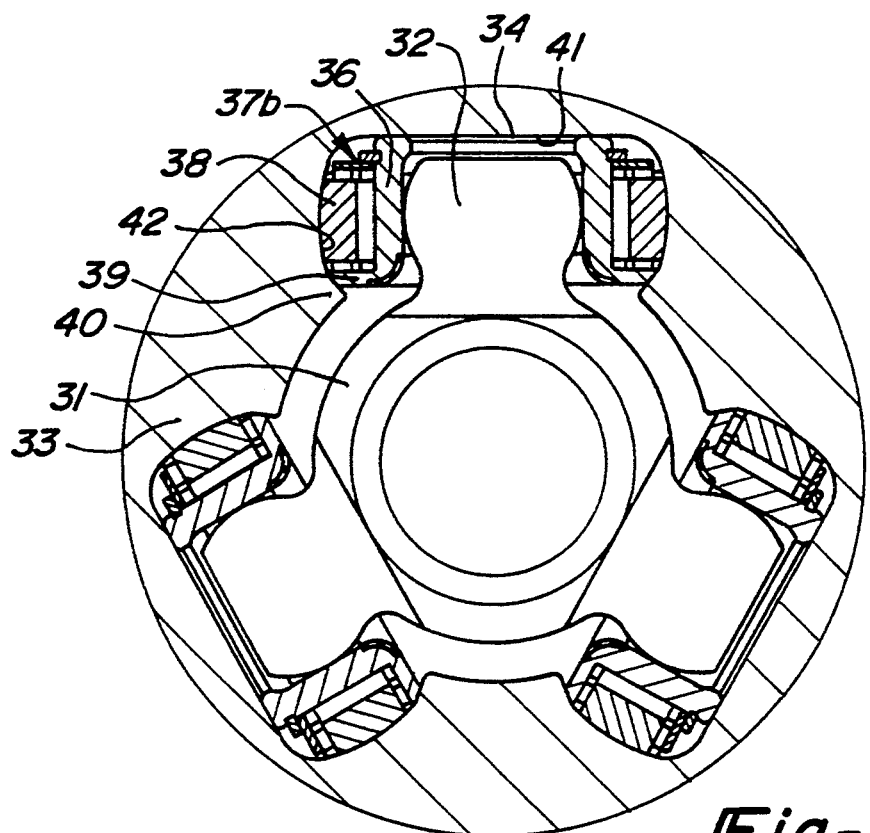
FIG. 5 is a cross sectional view of a joint with a second tripod design in accordance with the present invention.
Figure 6:
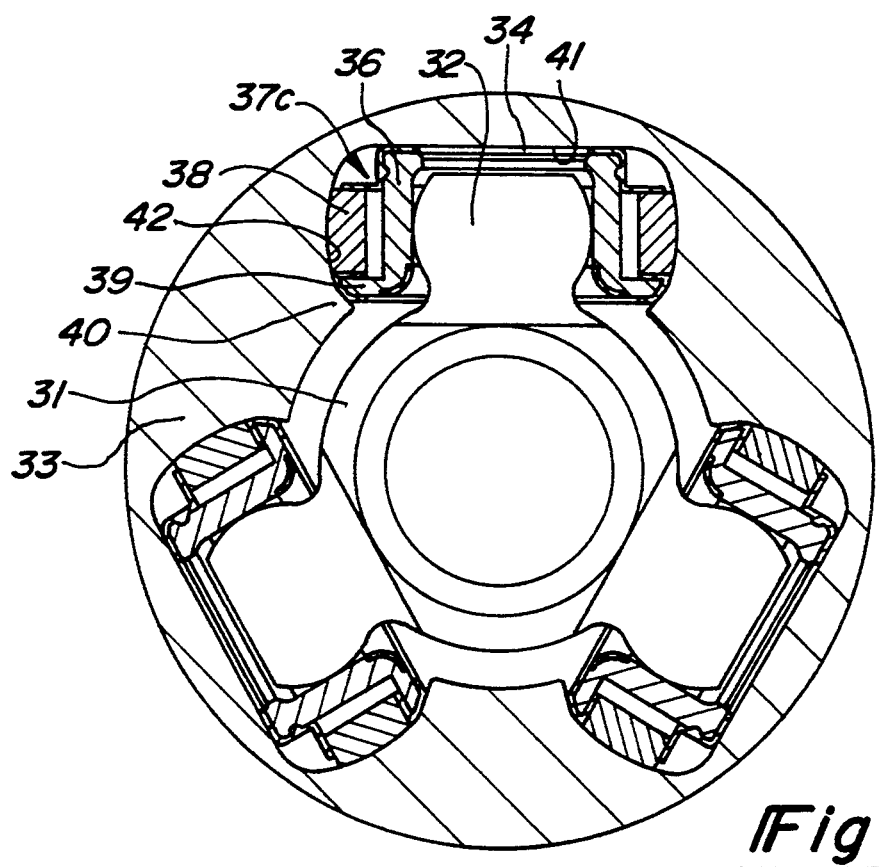
FIG. 6 is a cross sectional view of a joint with a second tripod design in accordance with the present invention.

FIGS. 4 through 6 will be described together to the extent that they include identical elements, which have been given the same reference numbers.

FIGS. 4 through 6 show a substantially annular inner joint part 31 which includes radially adjoining circumferentially distributed externally spherical arms 32. The arms 32 are inserted into circumferentially distributed recesses 34 of an outer joint part 33. Roller assemblies are positioned between the arms and recesses.

The roller assemblies each include a roller carrier 36 with an internally cylindrical inner aperture. The carrier 36 is held to be pivotable and axially movable on the arm 32 with reference to the arm axis. A roller 38 is held on the roller carrier 36 via bearing means 37a through c. The externally spherical roller 38 rides on one of the tracks 42 in the recess 34. On the radial inside of the roller assembly, both halves of the track each include a shoulder 40 which, on the radial inside, supports the roller carrier 36 via an annular shoulder 39. Also, the roller carrier 36 may be supported on a supporting face 41 on the radial outside of the roller assembly. The bearing means 37a (FIG. 4) are described in greater detail in FIG. 7, the bearing means 37 (FIG. 5) in FIG. 8 and the bearing means 37c (FIG. 6) in FIG. 9.

Figure 7:
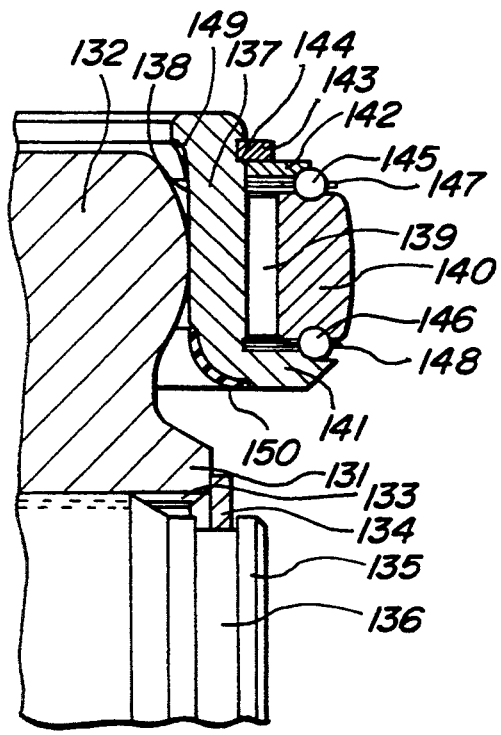
FIG. 7 is a longitudinal section through a roller assembly like that of FIGS. 4 through 6 of the invention.

FIG. 7 shows an inner joint part 131 with one of the spherical arms 132. Teeth 133 and a securing ring 134 hold the inner joint part on shaft journal 135. The securing ring 134 rests against the inner joint part and engages an annular groove 136 in the arm 132.

The roller assembly in accordance with the invention includes a roller carrier 137 in whose internally cylindrical recess 138 the spherical arm is positioned so as to be axially and, angularly movable. A first annular insert 149 in the recess 138 forms an upper stop and a lower annular insert 150 forms a pivot stop for the arm 132.

A roller 140 is rotatably supported on the roller carrier 137 via a needle bearing 139. With reference to the common axis, the roller 140 is axially supported on the roller carrier 137 on an annular shoulder 141 on the one hand and on a disc 142 on the other hand. The disc 142 is held by a securing ring 143 engaging an annular groove 144 on the outside of the roller carrier 137. Direct contact between the holding means is established via the annular shoulder 141, ball bearing 146 with cage 148, on the one hand and the disc 142 and securing ring 143 in connection with the annular groove 144 and ball bearing 145 with cage 147 on the other hand. The annular shoulder 141 and the disc 142 as well as the axial end faces of the roller 140 are provided with grooves for guiding the ball bearings 145, 146.

Figure 8:
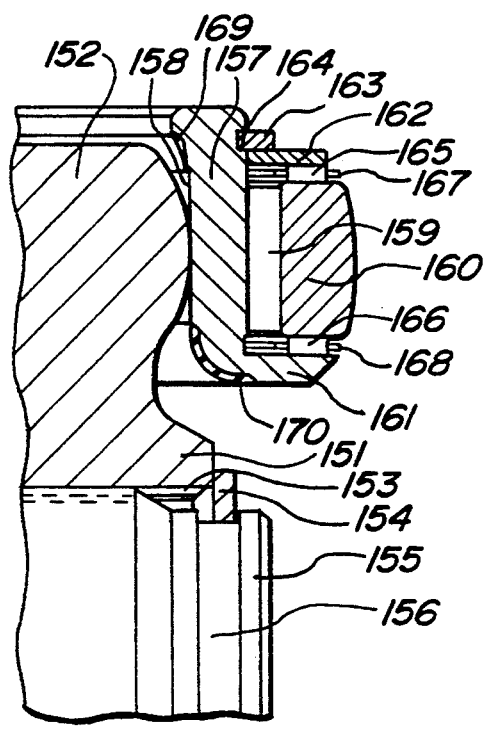
FIG. 8 is a view like that of FIG. 7 of a roller assembly according to a second embodiment of the invention.

In FIG. 8, any details corresponding to those in FIG. 7 have been given reference numbers increased by 20. The difference between the two figures is that needle bearings 165, 166 are provided instead of ball bearings. The needle bearings 165 may have a cylindrical or conical shape.

Figure 9:
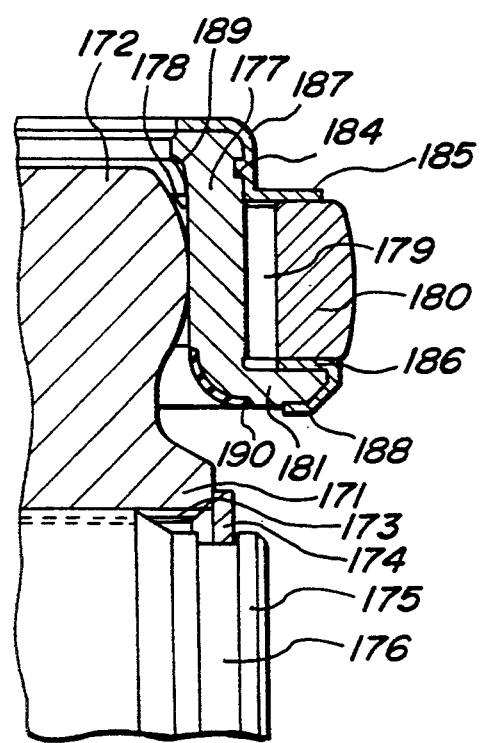

In FIG. 5, any details corresponding to those in FIG. 7 have been given reference numbers increased by 40. FIG. 9 deviates from FIG. 7 in that instead of a first rolling contact bearing a holding element 185 is provided which directly engages the annular groove 184. The holding element 185 includes a friction reducing material. The holding element 185 may be formed of a plate metal, have a non-steel bright surface, or be a self supporting holding element. Further, in FIG. 9, instead of a second rolling contact bearing between the annular shoulder 181 and the roller 180, an additional element 186 with a friction reducing surface is provided. Both elements 185, 186 may have friction reduction surface such as phosphated surfaces or plastic coated surfaces. At the roller carrier 177, with reference to the joint axis, an externally positioned shoulder element 187 is provided. The shoulder 187 is of a friction reducing material. Also positioned on the opposite side is a shoulder element 188 of a friction reducing material. The shoulder element 187 is integrally connected to the holding element 185 and the latter 188 is integrally connected to the additional element 186. The components may be clamped on to the roller carrier 177 if, in some region of its circumference, it is provided with slots.

While the above detailed description describes the preferred embodiment of the present invention, the invention is susceptible to modification, variation, and alteration without deviating from the scope and fair meaning of the subjoined claims.

I claim:

1. A tripod joint comprising:
    an outer joint part with three circumferentially distributed axis-parallel recesses forming circumferentially opposed tracks;
    an inner joint part having a tripod-shaped cross-section with three circumferentially distributed arms engaging the recesses of the outer joint part;
    roller assemblies on each arm, each roller assembly including roller carrying means and a roller directly riding on the tracks, each said roller carrying means being axially and angularly movable relative to an arm axis, and said roller being rotatably supported via a rolling contact bearing on each roller carrying means; and
    a pair of plate metal elements provided on opposite end faces of said roller as well as opposite end faces of said roller carrying means axially securing said roller relative to said roller carrying means, and contacting said outer joint part, said end face being generally normal to the axis of said roller, each plate metal elements being in contact with the respective roller end face, and said plate metal elements being connected to the roller carrying means and having a surface which reduces sliding friction, wherein the surface which reduces sliding friction is a non-steel-bright surface.

2. A joint according to claim one of the pair of wherein the plate metal elements being a self-supporting holding element non-rotatingly connected to the roller carrying means.

3. A tripod joint comprising:
    an outer joint part with three circumferentially distributed axis-parallel recesses forming circumferentially opposed tracks;
    an inner joint part having a tripod-shaped cross-section with three circumferentially distributed arms engaging the recesses of the outer joint part;
    roller assemblies on each arm, each roller assembly including roller carrying means and a roller directly riding on the tracks, each said roller carrying means being axially and angularly movable relative to an arm axis, and said roller being rotatably supported via a rolling contact bearing on each roller carrying means; and
    a pair of plate metal elements provided on opposite end faces of said roller as well as opposite end faces of said roller carrying means axially securing said roller relative to said roller carrying means and contacting said outer joint part, said end face being generally normal to the axis of said roller, each said plate metal element being in contact with the respective roller end face, and said plate metal element being connected to the roller carrying means and having a surface which reduces sliding friction, wherein the one of the plate metal elements being an additional element resting on first holding means on the roller carrying means, second holding means at the roller carrying means is an annular shoulder integral therewith, at least one of the second holding means and the additional element is provided with a surface coating which reduces sliding friction.

4. A joint according to claim 3, wherein at least the second holding means and the additional element include phosphated surfaces.

5. A joint according to claim 3, wherein at least the second holding means and the additional element include plastic-coated surfaces.

6. A joint according to claim 3, wherein the plate metal elements are radially resilient annular elements which, through internal tension are connected to the roller carrying element.

7. A joint according claim 3, wherein second holding means on the roller carrying means includes an externally positioned annular groove in the roller carrying means and one of said plate metal element resting on said annular groove.

8. A joint according to claim 7 wherein at least one of the holding means and the additional elements include phosphated surfaces.

9. A joint according to claim 7 wherein at least one of the holding means and the additional elements include plastic-coated surfaces.

10. A joint according to claim 7 wherein the plate metal elements are radially resilient annular elements which, through internal pre-tension are connected to the roller carrying means.

11. A tripod joint comprising:
    a outer joint part with three circumferentially distributed axis-parallel recesses forming circumferentially opposed tracks;
    an inner joint part having a tripod-shaped cross-section with three circumferentially distributed arms engaging the recesses of the outer joint part;

roller assemblies on each arm, each roller assembly including roller carrying means and a roller directly riding on the tracks, each said roller carrying means being axially and angularly movable relative to an arm axis, and said roller being rotatably supported via a rolling contact bearing on each roller carrying means; and at least a plate metal element provided opposite at least one end face of said roller, said end face being generally normal to the axis of said roller, said plate metal element being in contact with said roller end face, and said plate metal element being connected to the roller carrying means and having a surface which reduces sliding friction, said plate metal element resting on holding means projecting from the roller carrying means such that the plate metal element is disposed between said roller end face and said holding means, wherein at least one of the holding means and the plate metal element includes phosphated surfaces.

12. A joint according to claim 11, wherein the plate metal element being a self-supporting holding element non-rotatingly connected to the roller carrying means.

13. A tripod joint comprising:
a outer joint part with three circumferentially distributed axis-parallel recesses forming circumferentially opposed tracks;
an inner joint part having a tripod-shaped cross-section with three circumferentially distributed arms engaging the recesses of the outer joint part;
roller assemblies on each arm, each roller assembly including roller carrying means and a roller directly riding on the tracks, each said roller carrying means being axially and angularly movable relative to an arm axis, and said roller being rotatably supported via a rolling contact bearing on each roller carrying means; and
at least a plate metal element provided opposite at least one end face of said roller, said end face being generally normal to the axis of said roller, said plate metal element being in contact with said roller end face, and said plate metal element being connected to the roller carrying means and having a surface which reduces sliding friction, said plate metal element resting on holding means projecting from the roller carrying means such that the plate metal element is disposed between said roller end face and said holding means, wherein at least one of the holding means and the plate metal element includes plastic-coated surfaces.

14. A joint according to claim 13, wherein the plate metal element being a self-supporting holding element non-rotatingly connected to the roller carrying means.

15. A tripod joint comprising:
an outer joint part with three circumferentially distributed axis-parallel recesses forming circumferentially opposed tracks;
an inner joint part having a tripod-shaped cross-section with three circumferentially distributed arms engaging the recesses of the outer joint part;
roller assemblies on each arm, each roller assembly including roller carrying means and a roller directly riding on the tracks, each said roller carrying means being axially and angularly movable relative to an arm axis, and said roller being rotatably supported via a rolling contact bearing on each roller carrying means; and
at least a plate metal element provided opposite at least one end face of said roller as well as opposite the end face of said roller carrying means and contacting said outer joint part, said plate metal element of said roller being in contact with said roller end face, and said plate metal element being connected to the roller carrier means and being formed so as to be in contact with a recess in said roller carrier means and said plate metal element reduces sliding friction between said outer joint part and roller carrier means.

* * * * *

UNITED STATES PATENT AND TRADEMARK OFFICE
CERTIFICATE OF CORRECTION

PATENT NO. : 5,395,289
DATED : March 7, 1995
INVENTOR(S) : Karl Damian

It is certified that error appears in the above-indentified patent and that said Letters Patent is hereby corrected as shown below:

On the title page;
Under References Cited, under U.S. PATENT DOCUMENTS,
"Doréet al." should be --Doré et al.--

Column 3, after line 62, insert --FIG. 9 is a view like FIG. 7 of a roller assembly according to a third embodiment of the invention.--

Column 5, line 13, "FIG. 5" should be --FIG. 9--

Column 5, line 62, Claim 1, after "each" insert --said--

Column 6, line 1, Claim 2, after "claim" insert --1 wherein--

Column 6, line 2, Claim 2, delete "wherein"

Column 6, line 60, Claim 10, "pre-tension" should be --tension--

Column 8, line 33, Claim 15, delete "of said roller"

Signed and Sealed this

Tenth Day of October, 1995

Attest:

BRUCE LEHMAN

*Attesting Officer*   *Commissioner of Patents and Trademarks*